(12) United States Patent
Wilk et al.

(10) Patent No.: US 7,630,181 B2
(45) Date of Patent: *Dec. 8, 2009

(54) HIGH-POWER ULTRACAPACITOR ENERGY STORAGE PACK AND METHOD OF USE

(75) Inventors: Michael D. Wilk, Temecula, CA (US); Kevin T. Stone, San Diego, CA (US); Nino Adrian Villegas Quintana, National City, CA (US)

(73) Assignee: ISE Corporation, Poway, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 11/460,738

(22) Filed: Jul. 28, 2006

(65) Prior Publication Data

US 2006/0262467 A1    Nov. 23, 2006

Related U.S. Application Data

(63) Continuation of application No. 10/720,916, filed on Nov. 24, 2003, now Pat. No. 7,085,112, which is a continuation-in-part of application No. 09/972,085, filed on Oct. 4, 2001, now Pat. No. 6,714,391.

(51) Int. Cl.
*H02H 3/00* (2006.01)

(52) U.S. Cl. ....................... 361/42; 320/167

(58) Field of Classification Search .......... 361/42, 361/15, 16; 320/167, 166; 307/114
See application file for complete search history.

(56) References Cited

U.S. PATENT DOCUMENTS

| 3,299,650 | A | * | 1/1967 | Kramer ..................... 62/89 |
| 3,679,912 | A | | 7/1972 | Tenebaum |
| 3,809,969 | A | | 5/1974 | Williams et al. |
| 3,875,479 | A | | 4/1975 | Jaggar |
| 3,983,458 | A | | 9/1976 | Jordan et al. |

(Continued)

OTHER PUBLICATIONS

Maxwell Technologies, Series: MC BMOD Power Series 48v Module, Boostcap Ultracapictor Modules Brochure, Doc. # 1009364, pp. 1-4.

(Continued)

*Primary Examiner*—Stephen W Jackson
*Assistant Examiner*—Nicholas Ieva
(74) *Attorney, Agent, or Firm*—Stephen C. Beurle; Procopio Cory Hargreaves & Savitch LLP

(57) ABSTRACT

An ultracapacitor energy storage cell pack includes an ultracapacitor assembly including a plurality of parallel ultracapacitors and balancing resistors in series; an enclosure for the ultracapacitor assembly; a controller; one or more temperature sensors; a pack voltage sensor; a GFI sensor; one or more cooling fans carried by the enclosure; an on/off relay coupled to the ultracapacitor assembly and the controller, the on/off relay activated by the controller during normal operation of the ultracapacitor assembly and deactivated by the controller when the GFI sensor detects a ground fault interrupt condition, the one or more temperature sensors detect an over-temperature condition, or the pack voltage sensor detects an over-voltage condition; and a pre-charge resistor and a pre-charge relay coupled to the ultracapacitor assembly and the controller, and activated by the controller to cause the pre-charge resistor to limit pack charge current until the ultracapacitor assembly reaches a minimum voltage.

15 Claims, 7 Drawing Sheets

U.S. PATENT DOCUMENTS

| | | | |
|---|---|---|---|
| 4,021,631 A | | 5/1977 | Sprando |
| 4,163,269 A | * | 7/1979 | Helwig et al. ............... 361/42 |
| 4,292,813 A | | 10/1981 | Paddock |
| 4,314,008 A | * | 2/1982 | Blake ........................ 429/8 |
| 4,654,694 A | | 3/1987 | Val |
| 4,841,100 A | | 6/1989 | Ignasiak |
| 4,878,155 A | | 10/1989 | Conley |
| 4,913,983 A | | 4/1990 | Cheiky |
| 4,950,170 A | | 8/1990 | Miller, Jr. |
| 5,020,136 A | * | 5/1991 | Patsiokas et al. ............ 343/872 |
| 5,029,038 A | | 7/1991 | Covi et al. |
| 5,159,529 A | | 10/1992 | Lovgren et al. |
| 5,177,666 A | | 1/1993 | Bland et al. |
| 5,420,755 A | | 5/1995 | Hiller |
| 5,439,398 A | | 8/1995 | Testa et al. |
| 5,543,586 A | | 8/1996 | Crane, Jr. et al. |
| 5,610,371 A | | 3/1997 | Hashimoto et al. |
| 5,639,571 A | | 6/1997 | Waters et al. |
| 5,679,033 A | | 10/1997 | Eavey et al. |
| 5,707,242 A | | 1/1998 | Mitra et al. |
| 5,914,542 A | | 6/1999 | Weimer et al. |
| 5,920,463 A | | 7/1999 | Thomas et al. |
| 5,942,353 A | | 8/1999 | Schoultz |
| 5,982,050 A | * | 11/1999 | Matsui ..................... 307/10.7 |
| 6,033,267 A | | 3/2000 | Smyk |
| 6,333,091 B1 | * | 12/2001 | Kasugai et al. ............... 428/131 |
| 6,445,582 B1 | | 9/2002 | Oda et al. |
| 6,484,830 B1 | | 11/2002 | Gruenwald et al. |
| 6,620,538 B2 | * | 9/2003 | Bai et al. ..................... 429/23 |
| 6,626,235 B1 | | 9/2003 | Christie |
| 6,651,759 B1 | | 11/2003 | Gruenwald et al. |
| 6,828,697 B2 | | 12/2004 | Mattes |
| 6,833,983 B2 | * | 12/2004 | Nguyen et al. ............... 361/15 |
| 6,915,220 B2 | | 7/2005 | Cardinal et al. |
| 7,085,112 B2 | * | 8/2006 | Wilk et al. ................... 361/15 |
| 7,218,489 B2 | * | 5/2007 | Wilk et al. ................... 361/42 |
| 2001/0053465 A1 | * | 12/2001 | Fuglevand .................... 429/9 |
| 2003/0031526 A1 | | 2/2003 | Grant |
| 2003/0040881 A1 | * | 2/2003 | Steger et al. ................ 702/123 |
| 2003/0113599 A1 | * | 6/2003 | Pearson ..................... 429/23 |
| 2003/0137791 A1 | * | 7/2003 | Arnet et al. ................ 361/93.9 |
| 2004/0043287 A1 | | 3/2004 | Bando et al. |
| 2005/0250006 A1 | | 11/2005 | Kim |
| 2006/0076923 A1 | | 4/2006 | Eaves |

OTHER PUBLICATIONS

Maxwell Technologies, Series: MC BMOD Energy Series 48v Module, Boostcap Ultracapictor Modules Brochure, Doc. #1009365, pp. 1-4.

Loctite, Laboratory Data Sheet Product 3880 (Jun. 1999), 2 pages.

\* cited by examiner

HIGH-POWER ULTRACAPACITOR ENERGY STORAGE PACK AND METHOD OF USE

CROSS-REFERENCE TO RELATED APPLICATIONS

This patent application is a continuation of U.S. patent application Ser. No. 10/720,916, filed Nov. 24, 2003, issued as U.S. Pat. No. 7,085,112 on Aug. 1, 2006, which is a continuation-in-part application of U.S. patent application Ser. No. 09/972,085, filed Oct. 4, 2001, issued as U.S. Pat. No. 6,714,391 on Mar. 30, 2004. These applications/patents are incorporated by reference herein as though set forth in full.

FIELD OF THE INVENTION

The field of the invention relates to a high-voltage, high-power ultracapacitor energy storage pack composed of a large number of serially connected individual low-voltage ultracapacitor cells that store an electrical charge.

BACKGROUND OF THE INVENTION

The connecting together of individual battery cells for high-voltage, high-energy applications is well known. However, the chemical reaction that occurs internal to a battery during charging and discharging typically limits deep-cycle battery life to hundreds of charge/discharge cycles. This characteristic means that the battery pack has to be replaced at a high cost one or more times during the life of a hybrid-electric or all-electric vehicle. Batteries are somewhat power-limited because the chemical reaction therein limits the rate at which batteries can accept energy during charging and supply energy during discharging. In a hybrid-electric vehicle application, battery power limitations restrict the drive system efficiency in capturing braking energy through regeneration and supplying power for acceleration.

Ultracapacitors are attractive because they can be connected together, similar to batteries, for high-voltage applications; have an extended life of hundreds of thousands of charge/discharge cycles; and can accept and supply much higher power than similar battery packs. Although ultracapacitors are typically more expensive than battery packs for the same applications and cannot store as much energy as battery packs, ultracapacitor packs are projected to last the life of the vehicle and offer better fuel-efficient operation through braking regeneration energy capture and supplying of vehicle acceleration power.

During charging and discharging operation of the ultracapacitors, parasitic effects cause the cell temperature to increase. Cooling is required to minimize increased temperature operation that would degrade the energy storage and useful life of each ultracapacitor.

Low-voltage energy cells, batteries, or ultracapacitors are connected in series to obtain high-voltage energy storage. Because of variations in materials and manufacturing, energy storage cells are not perfectly matched. As the serially connected pack operates through multiple charge and discharge cycles, the cell differences cause the energy storage to become more and more imbalanced among the cells. The energy storage imbalance from cell to cell limits the performance of the overall pack and can shorten the life of the individual cells.

Packs of batteries and packs of ultracapacitors have been built in various forms and configurations. Various different wiring harnesses, buss bars, and connections have been used for current routing and voltage monitoring. Various different types of circuits for charging, discharging, and equalizing have also been built. Energy storage cells have been mounted in various "egg crate" or "wine rack" style vertical and horizontal support structures. High-voltage packages contain batteries enclosed within a single pack. Batteries have even been connected together by simply touching under some pressure the positive end of one battery against the negative end of another battery such as can be found in flashlights, small toys and appliances. High-energy packs usually include some form of convection air or liquid cooling.

SUMMARY OF THE INVENTION

The present invention involves an ultracapacitor high-energy storage pack with structural support, environmental protection, automatic cooling, electrical interconnection of the ultracapacitors, remote ON/OFF switching, a safety pre-charge circuit, a safety and automatic equalizing discharge circuit, a programmable logic controller, a digital interface to a control area data network for control and status reporting, and an optional fire sensing and suppression system. The pack is ideal for high-voltage, high-power applications of electric and hybrid-electric vehicle propulsion systems, fixed site high-power load averaging, and high-power impulse requirements. The pack is housed in an aluminum box enclosure with a detachable access lid. The inside of the box has a thick anti corrosion, electrically insulating coating. The box has holes cut out for the mounting of cooling fans, air intakes, and electrical connections. The air intake cutouts have provision for mounting external replaceable air filters that can be serviced without opening the box. Mounted to the interior of the box are aluminum guide support strips for three plastic support plates. Plastic, as a non-conductive material, provides for the safe operation of the high-voltage connections. Two of the plastic plates have wine rack hole cutouts that form the support structure for individual cylindrical ultracapacitor cans and the third plastic plate has pre mounted buss bars and smaller holes for fastening bolts. The first two plastic plates structurally support and separate the ultracapacitors to provide space for cooling airflow along the direction of the plates. The third plate supports and positions the cans by the threaded end terminals that are bolted to the plate. Buss bars are fastened to the inside of the third plate to provide connections between adjacent rows of ultracapacitors. The cans, which are arranged in rows of three, are electrically and structurally connected together with threaded studs and buss bars.

In a preferred embodiment, the triple can connections are arranged four rows deep and twelve rows along the top to efficiently package one-hundred and forty four (144) cylindrically shaped ultracapacitor cans with threaded polarized connections at each end of the can. For different design requirements, the longitudinal dimension of the box may be shortened or lengthened to respectively delete or add one or more layers of twelve (12) ultracapacitors. Similarly, the depth dimension of the box may be shortened or lengthened to respectively delete or add a layer of thirty-six (36) ultracapacitors. Again similarly, the width dimension of the box may be shortened or lengthened to respectively delete or add a layer of forty-eight (48) ultracapacitors.

In addition to the ultracapacitors, the box houses and has mounting provision for other electrical components. Temperature sensors and controllers switch the forced-air cooling fans on and off for thermal management of the ultracapacitor environment. A pre-charge resistor is automatically switched in series with the power charge circuit when first turned on to prevent overloading the charging energy source. High-power relays called contactors provide remote controlled switching of the energy storage pack into and out of the charge and load circuits. An integral Control Area Network (CAN) controller is connected to multiple pin electronics connectors to report status parameters and control the switching of the energy storage pack through a CAN digital data network. The pack also contains integral Ground Fault Interrupter (GFI) and fire sensing automatic safety shutoff systems.

Finally, a balancing or drain resistor is mounted in parallel around each ultracapacitor to safely discharge the pack to an inactive state over a period of time. This periodic discharge function also serves to equalize all the ultracapacitors energy storage to a balanced condition.

A further aspect of the invention involves an ultracapacitor energy storage cell pack including an ultracapacitor assembly having a plurality of parallel ultracapacitors and balancing resistors in series, each balancing resistor in parallel with each ultracapacitor to automatically discharge each ultracapacitor over time, thereby balancing the ultracapacitors of the ultracapacitor assembly; an enclosure to enclose and protect the ultracapacitor assembly; a controller for the ultracapacitor assembly; one or more temperature sensors to monitor temperature of the ultracapacitor assembly and coupled to the controller; a pack voltage sensor to monitor voltage of the ultracapacitor assembly and coupled to the controller; a GFI sensor to monitor for a ground fault interrupt condition of the ultracapacitor assembly and coupled to the controller; one or more cooling fans carried by the enclosure and controlled by the controller to cool the ultracapacitor assembly based upon temperature sensed by the one or more temperature sensors; an on/off relay coupled to the ultracapacitor assembly and the controller, the on/off relay activated by the controller during normal operation of the ultracapacitor assembly and deactivated by the controller when the GFI sensor detects a ground fault interrupt condition, when the one or more temperature sensors detect an over-temperature condition, or when the pack voltage sensor detects an over-voltage condition; and a pre-charge resistor and a pre-charge relay coupled to the ultracapacitor assembly and the controller, the pre-charge relay activated by the controller to cause the pre-charge resistor to limit pack charge current until the ultracapacitor assembly reaches a minimum voltage.

Another aspect of the invention involves a method of using an ultracapacitor energy storage cell pack including the steps of providing an ultracapacitor energy storage cell pack including a ultracapacitor assembly having a plurality of parallel ultracapacitors and balancing resistor in series, each balancing resistor in parallel with each ultracapacitor to automatically discharge each ultracapacitor over time, thereby balancing the ultracapacitors of the ultracapacitor assembly and assuring a safe condition for service personnel; an enclosure to enclose and protect the ultracapacitor assembly; a controller for the ultracapacitor assembly; one or more temperature sensors to monitor temperature of the ultracapacitor assembly and coupled to the controller; a pack voltage sensor to monitor voltage of the ultracapacitor assembly and coupled to the controller; a GFI sensor to monitor for a ground fault interrupt condition of the ultracapacitor assembly and coupled to the controller; one or more cooling fans carried by the enclosure and controlled by the controller to cool the ultracapacitor assembly based upon temperature sensed by the one or more temperature sensors; an on/off relay coupled to the ultracapacitor assembly and the controller, the on/off relay activated by the controller during normal operation of the ultracapacitor assembly and deactivated by the controller when the GFI sensor detects a ground fault interrupt condition, when the one or more temperature sensors detect an over-temperature condition, or when the pack voltage sensor detects an over-voltage condition; and a pre-charge resistor and a pre-charge relay coupled to the ultracapacitor assembly and the controller, the pre-charge relay activated by the controller to cause the pre-charge resistor to limit pack charge current until the ultracapacitor assembly reaches a minimum voltage; automatically discharging the ultracapacitors of the ultracapacitor energy storage cell with the balancing resistors to balance ultracapacitors of the ultracapacitor assembly and assure a safe condition for service personnel; cooling the ultracapacitor assembly with the one or more cooling fans based upon temperature sensed by the one or more temperature sensors; activating the on/off relay with the controller during normal operation of the ultracapacitor assembly and deactivating the on/off relay with the controller when the GFI sensor detects a ground fault interrupt condition, when the one or more temperature sensors detect an over-temperature condition, or when the pack voltage sensor detects an over-voltage condition; and activating the pre-charge relay with the controller to cause the pre-charge resistor to limit pack charge current until the ultracapacitor assembly reaches a minimum voltage.

BRIEF DESCRIPTION OF THE DRAWINGS

The accompanying drawings, which are incorporated in and form a part of this specification, illustrate embodiments of the invention and together with the description, serve to explain the principles of this invention.

DETAILED DESCRIPTION OF PREFERRED EMBODIMENTS

Figure 1:
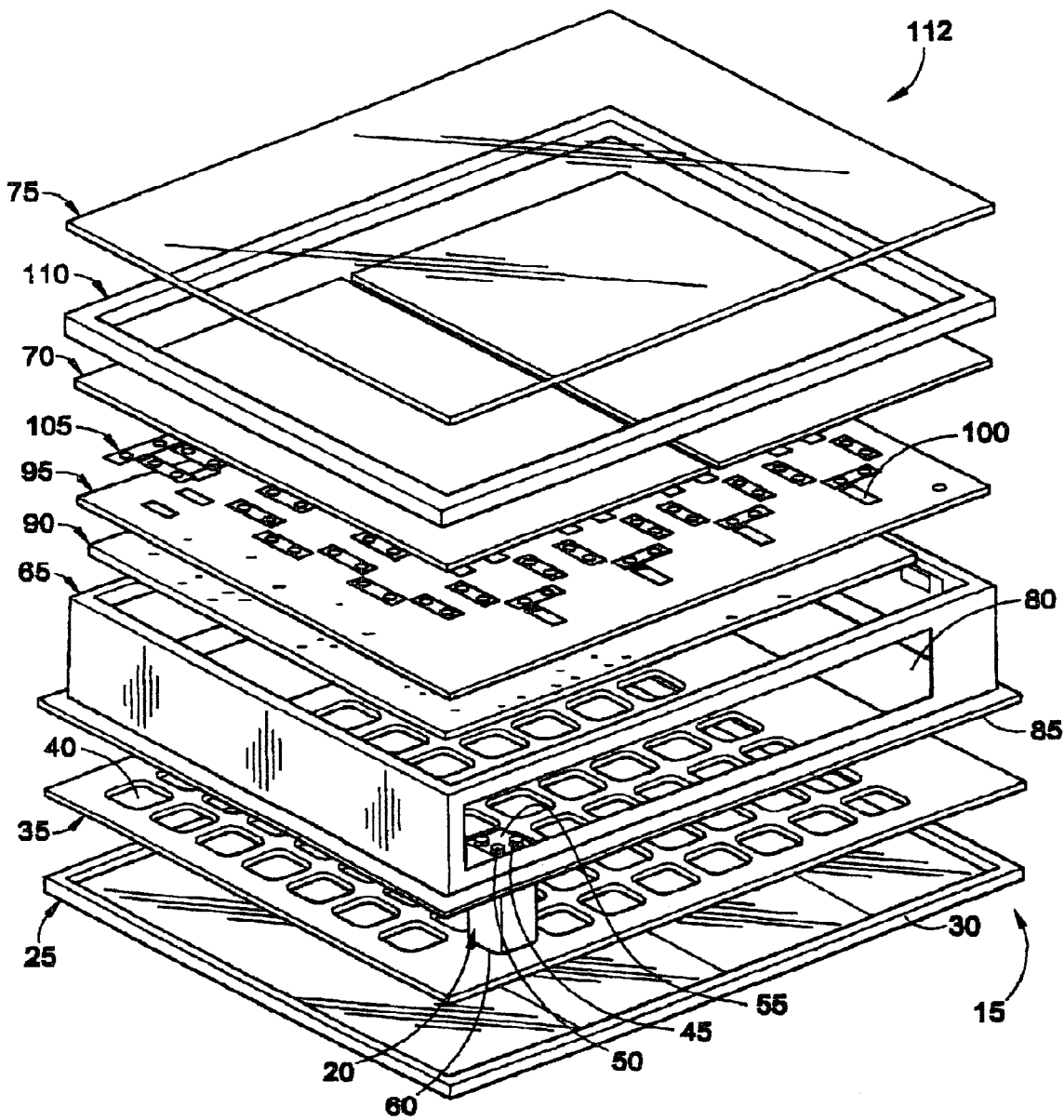
FIG. 1 is an exploded perspective view drawing of an embodiment of a half module of an ultracapacitor energy storage cell pack.
Figure 2:
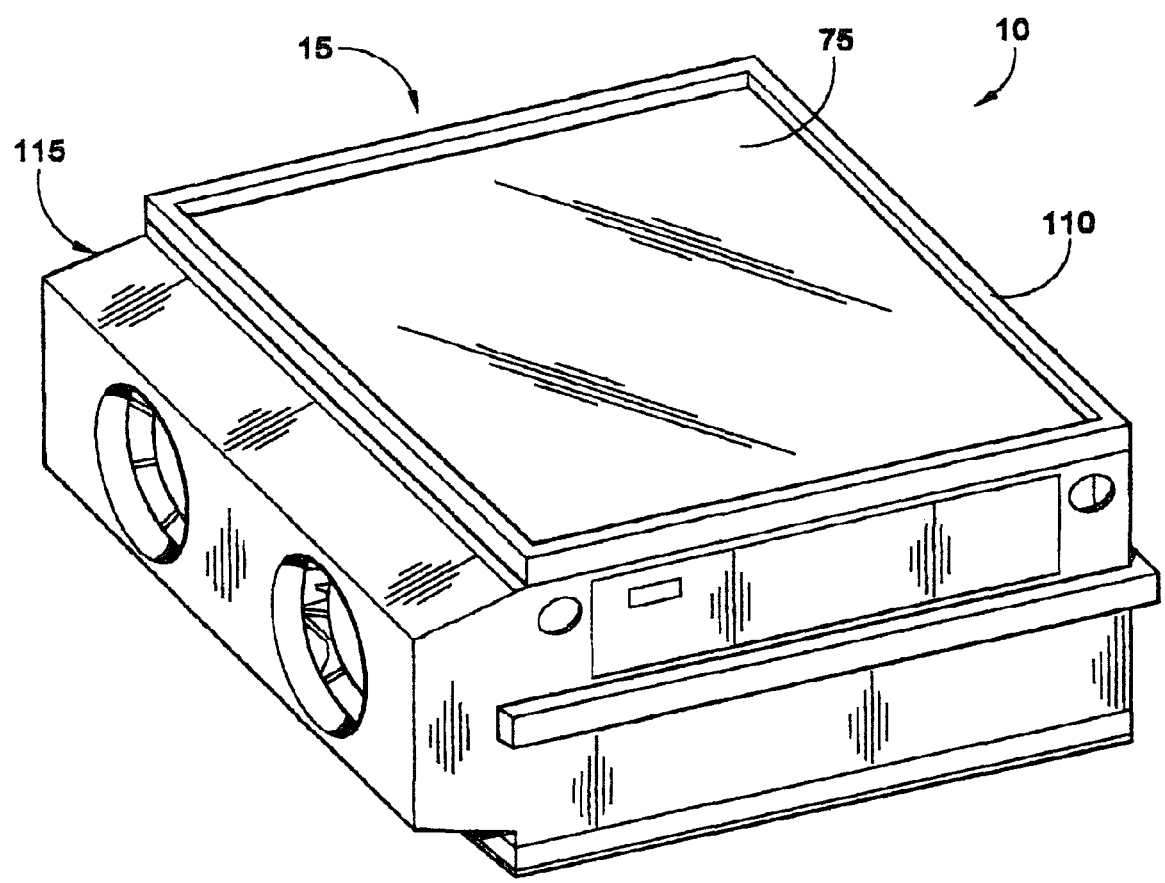
FIG. 2 is a perspective view of an embodiment of an ultracapacitor energy storage cell pack.

With reference to FIGS. 1 and 2, an embodiment of an ultracapacitor energy storage cell pack 10 will now be described. FIG. 1 illustrates an exploded view of an embodiment of a half module 15 of the ultracapacitor energy storage cell pack 10. FIG. 2 illustrates an embodiment of an assembled ultracapacitor energy storage cell pack module 10, which includes two half modules 15 fastened together. Although each half module 15 preferably includes eighty ultracapacitors 20, each half module may have other numbers of ultracapacitors 20. Further, the ultracapacitor pack 10 may have other numbers of modules 15 besides a pair (e.g., 1, 3, 4, etc.).

The ultracapacitor pack 10 is shown in exploded view in FIG. 1 to illustrate the different levels in the half module 15 that are added during assembly of the half module 15. Each of these levels will now be described in turn below followed by a description of the assembly process.

An aluminum base plate 25 forms a bottom or inner-most level of the half module 15. The base plate 25 includes a welded frame 30 around edges of the base plate 25.

A polycarbonate crate plate 35 is seated inside the frame 30 and includes cutouts or holes 40 with a shape that matches the cross-section of the ultracapacitors 20. The base plate 25 and crate cutouts 40 form an x, y, and z location and mounting support for the ultracapacitors 20. The cutouts 40 also prevent the ultracapacitors 20 from rotating during use, e.g., mobile vehicle use.

In the embodiment shown, the individual ultracapacitors 20 have a general square-can shape (i.e., rectangular parallelepiped). The cross-section of the ultracapacitors 20 is 2.38 in. by 2.38 in. and the length is about 6 in. On an upper-most or outer-most end of the ultracapacitor 20, two threaded lug terminals 45 and a dielectric paste fill port 50 protrude from an insulated cover 55 of the ultracapacitor 20. The cover 55 of the ultracapacitor may include a well encircled by a protruding rim. Shrink plastic that normally surrounds sides or exterior capacitor casing 60 of the ultracapacitor 20 is removed to better expose the exterior casing 60 to circulated cooling air. The shrink plastic may be left on the bottom of the ultracapacitor 20.

A box frame 65 ties together the base plate 25 and frame 30 with circuit boards 70, and a top polycarbonate cover 75. The box frame 65 has elongated lateral cutouts 80 on two opposing sides to provide for cross-flow air cooling. Bottom flanges 85 provide a mounting surface to tie two of these box frames 65, and, hence, two half modules 15, together to form the single ultracapacitor pack module 10 shown in FIG. 2. The box frame 65 includes a large upper rectangular opening and a large lower rectangular opening.

The next layer is a first ¼-in. foam rubber insulating and sealing sheet 90 that covers the ultracapacitors 20. The first sheet 90 has cutouts for the ultracapacitor terminals 45 and fill port 50 so that the sheet 90 can seal tightly against the cover 55 of the ultracapacitor 20.

A second ⅛-in. foam rubber insulating and sealing sheet 95 may be placed on top of the previous first sheet 90. The second sheet 95 includes rectangular cutouts or holes 100. The cutouts 100 receive copper bar electrical interconnections 105. The cutouts 100 in the sheet 95 simplify the assembly and proper placement of the copper bar electrical interconnections 105. The sheet 95 also seals the copper bar electrical interconnections 105. The copper bar electrical interconnections 105 include holes that the ultracapacitor terminals 45 protrude through.

Figure 3:
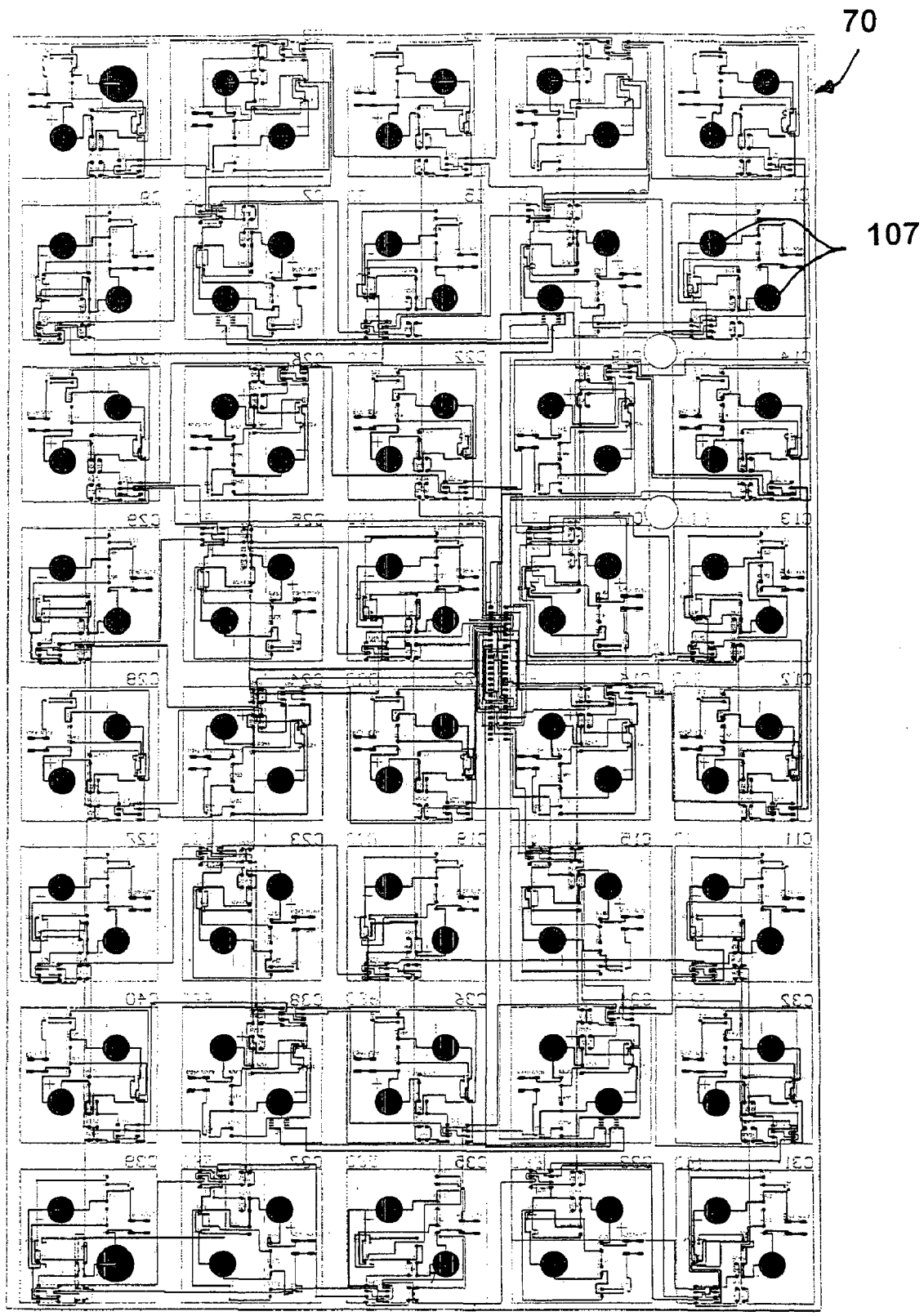
FIG. 3 is a top plan view of an embodiment of a circuit board for the half module illustrated in FIG. 1 and ultracapacitor energy storage cell pack illustrated in FIG. 2.

Two identical main circuit boards 70 (e.g., 40-ultracapacitor main circuit boards) may lay on top of the foam rubber sheets 90, 95. With reference additionally to FIG. 3, each main circuit board 70 may include holes 107 that the ultracapacitor terminals 45 protrude through. In the embodiment shown, each circuit board 70 may have mounting holes 107 for 40 (8 by 5) ultracapacitors less two corner positions required for frame structure mounting. Instead of two circuit boards 70, a single circuit board 70 may be used. Thus, as used herein, the word "circuit board" means one or more circuit boards. Fasteners such as lug nuts fasten the individual ultracapacitor terminals 45 and copper bars 105 to the circuit boards 70 and compress the foam rubber sheets 90, 95 in between the cover 55 of the ultracapacitor 20 and the circuit boards 70. Thus, the circuit board 70 forms the location and mechanical support as well as the electrical connections for the ultracapacitors 20. The foam sheets 90, 95 seal around the rim of the ultracapacitor terminals 45. A processor and display circuit board mounts on top of the main circuit board 70.

Although the ultracapacitor pack 10 and the half modules 15 are shown as being generally rectangular in shape, either or both may have shapes other than generally rectangular such as, but not by way of limitation, circular, oval, other curvilinear shapes, other rectilinear shapes, and other polygonal shapes.

A top aluminum frame 110 and the transparent polycarbonate cover 75 may attach to the frame structure to complete the half module 15. The transparent cover 75 allows observation of a light emitting diode (LED) failure detection display that indicates the active/inactive status of the ultracapacitors 20.

Together, the bottom base plate 25, crate plate 35, box frame 65, sealing sheets 90, 95, and circuit board(s) 70, and ultracapacitor terminal fasteners form an ultracapacitor mounting assembly 112 for the ultracapacitors 20. The ultracapacitor mounting assembly 112 provides a mounting surface for the copper bar interconnects 105, maintains the position and spacing of the ultracapacitors 20 in the X, Y, and Z directions, does not allow the ultracapacitors to rotate when connected, and the main circuit board(s) 70 provides a mounting platform for the cell equalization, failure detection, processor, and LED display systems. Attaching the ultracapacitors 20 to the mounting assembly 112 by the terminals 45 instead of the exterior ultracapacitor casing 60 allows the ultracapacitors 20 to be more effectively cooled because the majority of the surface area of the ultracapacitors 20 is in the cooling air stream supplied by the cross-flow air cooling assembly 115. Sealing along the cover 55 and around the terminals 45 protects the terminals 45 from water, dust, and other contaminants.

An exemplary method of assembling the ultracapacitor half module 15 will now be described. The ultracapacitors 20 are first placed onto the bottom base plate 25, with the bottoms of the ultracapacitors 20 extending through the square cutouts 40 of the crate plate 35. The box frame 65 is applied over the ultracapacitors 20, so that the ultracapacitors extend through the large lower and upper rectangular openings of the box frame 65. The ¼-in. foam rubber insulating and sealing sheet 90 is placed on top of the ultracapacitors 20, with the ultracapacitor terminals 45 and fill port 50 protruding through cutouts in the sheet 90. The ⅛-in. foam rubber insulating and sealing sheet 95 is placed on top of the previous sheet 90 and the copper bar electrical interconnections 105 are placed into the rectangular cutouts 100 of the sheet 95. The ultracapacitor terminals 45 also protrude through holes in the copper bar electrical interconnections 105. The main circuit boards 70 are layered on top of the foam rubber sheets 90, 95 so that the threaded ultracapacitor terminals 45 protrude through the corresponding holes in the circuit boards 70. Lug nuts are screwed onto the threaded terminals 45, compressing the foam rubber sheets 90, 95 in between the cover 55 of the ultracapacitor 20 and the circuit boards 70, and securing the ultracapacitors 20 and copper bars 105 in position. The processor and display circuit board is mounted on top of the main circuit board 70. The top aluminum frame 110 and the transparent polycarbonate cover 75 are placed over the circuit boards and attached to the frame structure to complete the half module 15. A pair of half modules 15 may be positioned back to back (i.e., facing opposite directions with the bottoms of the aluminum base plates 25 touching) and a cross-flow air cooling assembly 115 may be attached to the frame structure, adjacent the elongated lateral cutouts 80 on one side of the box frames 65. The half modules 15 may be bolted or otherwise fastened together at the respective bottom flanges 85 to complete the ultracapacitor pack module 10.

To determine if one or more ultracapacitors 20 in the pack 10 need to be replaced, a user observes the light emitting diode (LED) failure detection display through the transparent cover 75. The LED failure detection display includes an array of LEDs that correspond to the array of ultracapacitors 20, each LED indicating the status of a corresponding ultracapacitor 20. Each unlit LED indicates a corresponding failed LED. An ultracapacitor 20 in the pack 10 can quickly and easily be replaced by simply unfastening the frame and unbolting only the failed ultracapacitor 20 that had been previously identified by the LED display. The replacement ultracapacitor is put into position and the procedure reversed.

Figure 4:
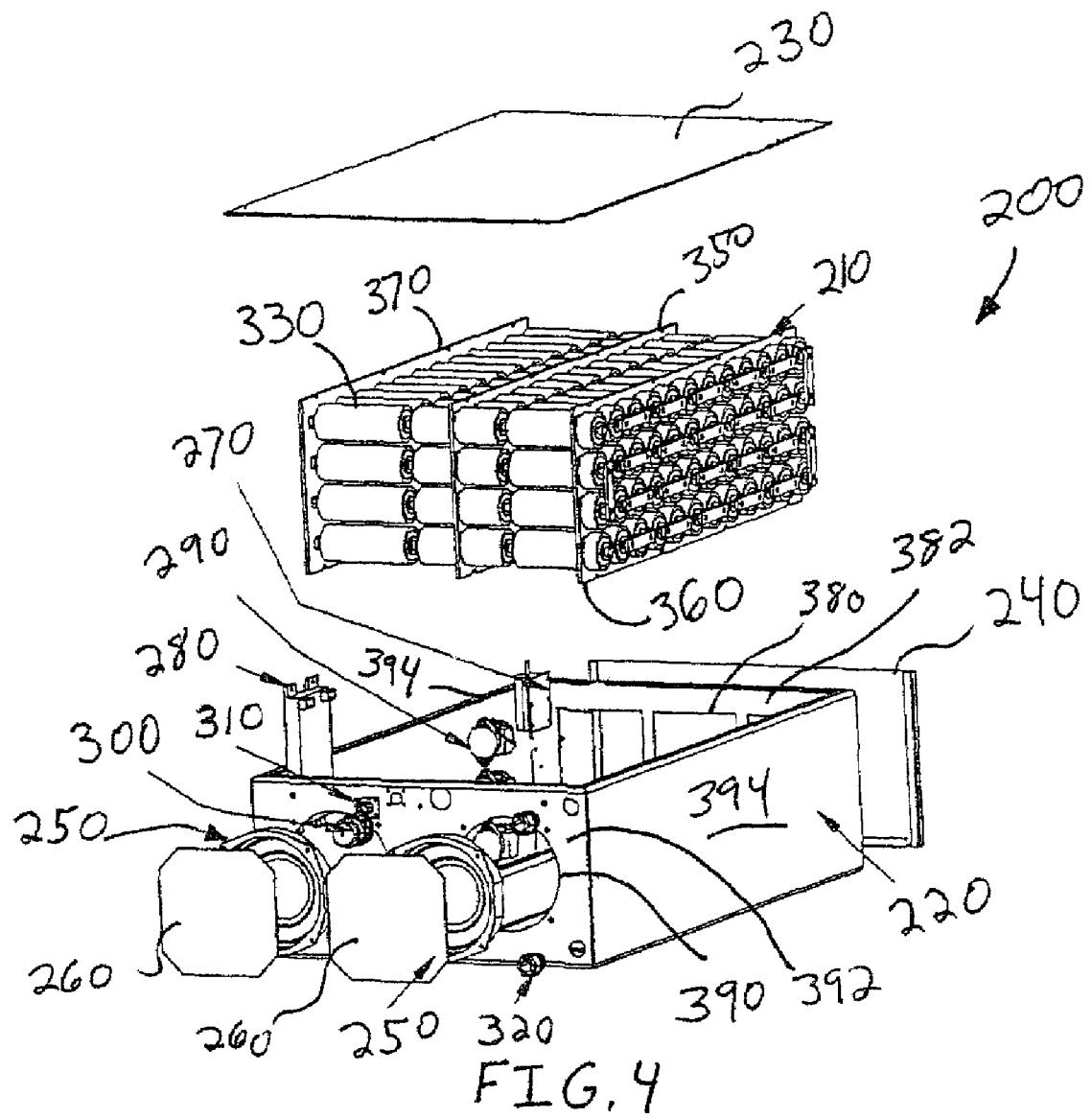
FIG. 4 is an exploded perspective view of an alternative embodiment of a ultracapacitor energy storage cell pack.
Figure 5:
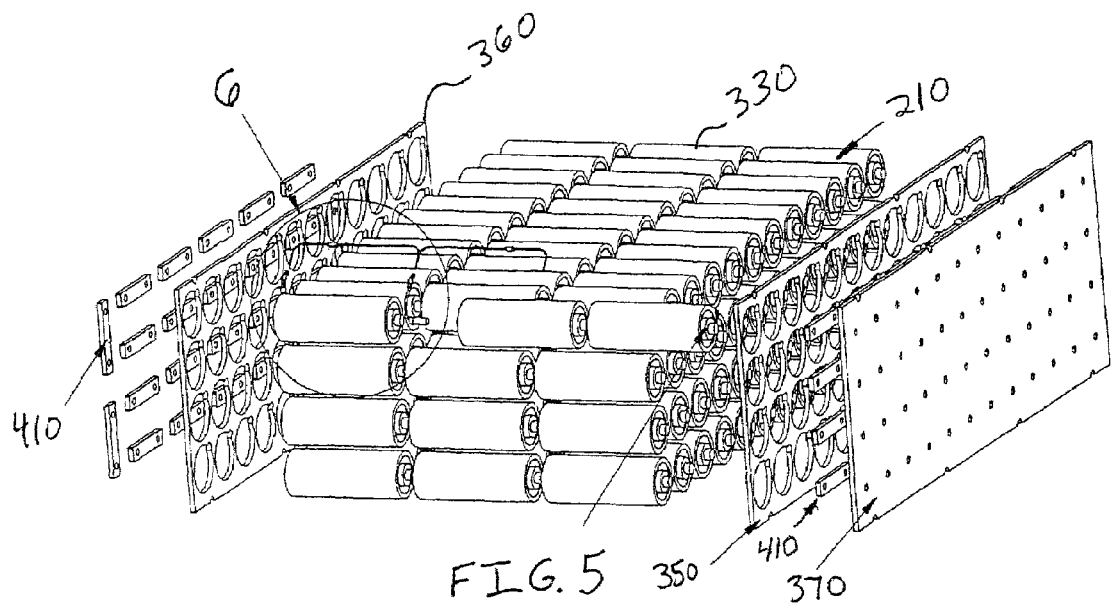
FIG. 5 is an exploded perspective view of the ultracapacitors and support plates of the ultracapacitor energy storage cell pack of FIG. 4.

With reference to FIGS. 4-9, and initially, FIGS. 4 and 5, an ultracapacitor energy storage cell pack (hereinafter "ultracapacitor pack) 200 constructed in accordance with another embodiment of the invention will now be described. The ultracapacitor pack 200 includes a ultracapacitor cell and winerack support assembly (hereinafter "ultracapacitor assembly") 210, an ultracapacitor pack box enclosure (hereinafter "box enclosure") 220, a metal lid 230, an air filter bracket 240 (w/air filter), cooling fans 250, fan finger guards 260, higher-power precharge resistor 270, Programmable Logic Controller module (hereinafter "PLC") 280, high power relays (kilovac contactors) 290, electrical connectors 300, 310, 320 and other discrete components mounted within the box enclosure 220.

Figure 6:
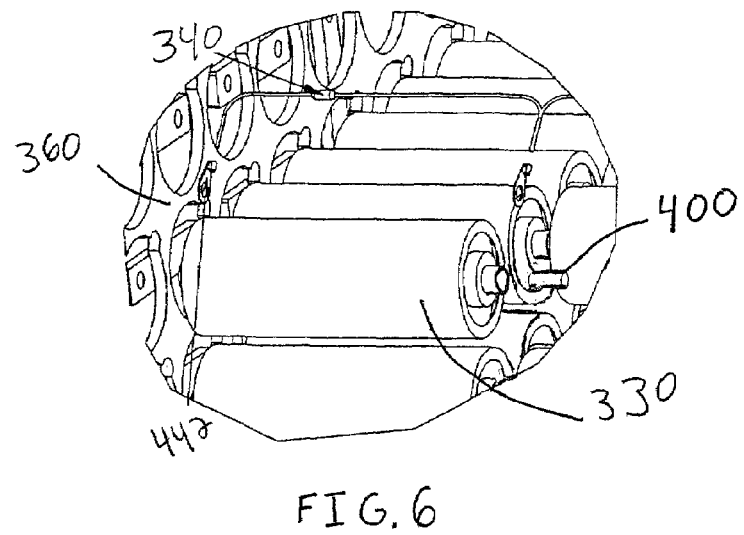
FIG. 6 is perspective detail view taken of detail 6 of the ultracapacitors, threaded interconnections between the ultracapacitors, and parallel drain resistors mounted with ring terminals of the ultracapacitor energy storage cell pack of FIG. 5.

The ultracapacitor assembly 210 includes one-hundred and forty-four (144) ultracapacitors 330 connected in series to provide a nominal 360 volts DC, 325 watt-hours energy storage. The value of each ultracapacitor 330 is 2600 Farads. In alternative embodiments, the ultracapacitor assembly 210 may have other numbers of ultracapacitors, different types of ultracapacitors, and/or an overall different amount of voltage and/or power. Each ultracapacitor 330 is connected with a parallel drain resistor 340 (FIG. 6). The ultracapacitor assembly 210 includes a first wine rack middle support plate 350, a similar second wine rack middle support plate 360, and a wine rack end support plate 370 for supporting the ultracapacitors 330.

The box enclosure 220 is preferably made of metal and includes square end cutouts 380 in rear wall 382 to accommodate air flow therethrough and circular cutouts 390 in front wall 392 to accommodate the cooling fans 250. The front wall 392 and rear wall 382 are joined by opposite parallel side walls 394. The filter(s) of the air filter bracket 240 is externally serviceable and fits over the square cutouts 380 of the rear wall 382. The interior of the box enclosure 220 and underside of the lid 230 is coated with a thick material that provides electrical insulation and corrosion protection as an additional level of safety for the box enclosure 220. The inner bottom of the box enclosure 220 includes support plate guides for mounting the wine rack middle support plates 350, 360 and end support plate 370.

FIG. 5 shows an exploded view of the ultracapacitor assembly 210. The ultracapacitors 330 are cylindrical canisters with aluminum female threaded connections at each end, which receive male threaded aluminum interconnection studs 400 for connecting the ultracapacitors 330 in series. Aluminum bus bars 410 and aluminum interconnection washers are also used to interconnect the ultracapacitors 330 in series at the ends of the rows. Providing electrical connections made of aluminum metal prevents any corrosive galvanic effects from dissimilar metals. Additionally, the threaded connections are covered with a silicon dielectric grease to prohibit environmentally caused corrosion.

The wine rack middle support plates 350, 360 and end support plate 370 are made of nonconductive plastic material to prevent any high-voltage arcing or other high-voltage leakage effects that could occur over time due to vibration and shock. The wine rack middle support plates 350, 360 and end support plate 370 are different in construction to allow ease of assembly and replacement of any canister row.

Figure 7:
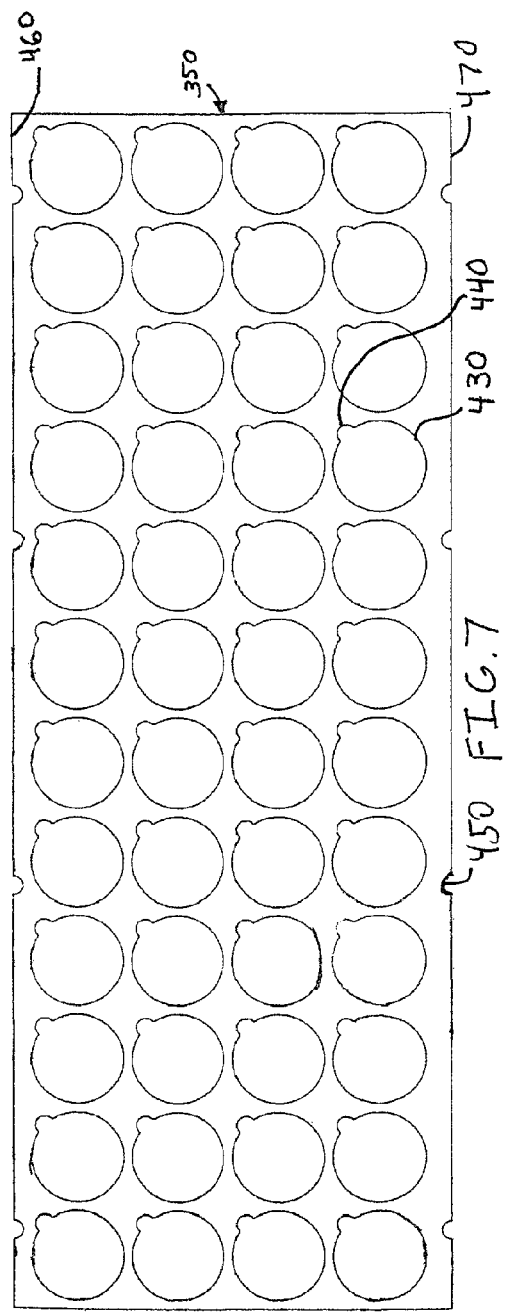
FIG. 7 is a side-elevational view of an embodiment of a middle support plate of the ultracapacitor energy storage cell pack illustrated in FIG. 4, and the middle support plate is shown with cutouts for the ultracapacitors and the drain resistors.

With reference to FIG. 7, the wine rack middle support plates 350, 360 include a pattern of generally circular cutouts 430 for receiving the ultracapacitors 330. The cutouts 430 include an additional semi-circular recess 440 to accommodate and support the drain resistors 340. The drain resistors 340 are preformed with ring terminals 442 (FIG. 6) attached to leads of the drain resistors 340 for simplicity of mounting and electrical connection. Additional semi-circular recesses 450 along a top edge 460 and bottom edge 470 of the wine rack middle support plates 350, 360 provide clearance for the attaching rivets of support guides on a bottom of box enclosure 220 and the lid 230. The wine rack middle support plates 350, 360 are made of 3/16" thick polycarbonate plastic for strength and electrical insulation.

Figure 8:
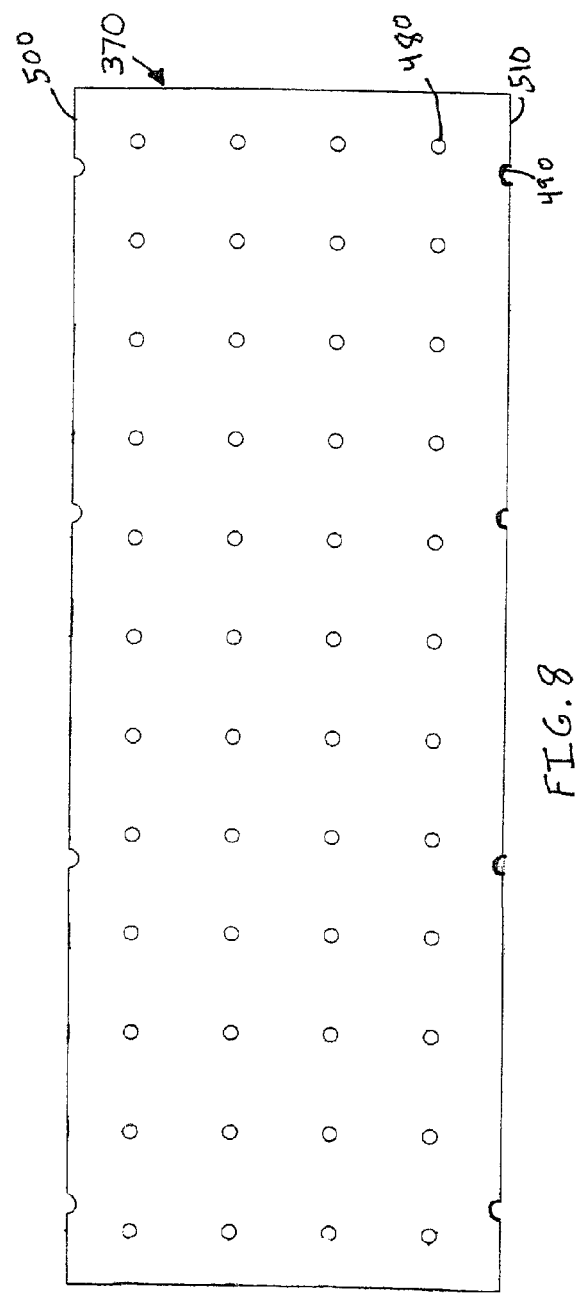
FIG. 8 is a side-elevational view of an embodiment of an end support plate of the ultracapacitor energy storage cell pack illustrated in FIG. 4, and the end support plate is shown with cutouts for the mounting bolts and the support guide mounting rivets.

With reference to FIG. 8, the wine rack end support plate 370 includes a pattern of circular holes 480 for receiving threaded bolt fasteners for mounting the ultracapacitors 330. Additional semi-circular recesses 490 along a top edge 500 and a bottom edge 510 of the wine rack end support plate 370 provide clearance for the attaching rivets of support guides on a bottom of the box enclosure 220 and the lid 230. The wine rack end support plate 370 is made of 3/16" thick Grade G-10/FR4 Garolite glass fabric laminate with an epoxy resin that absorbs virtually no water and holds its shape well. Inside-mounted aluminum bus bars 410 are affixed in place to the wine rack end support plate 370 with silicon RTV (Room Temperature Vulcanizing, which is a common jelly-like paste that cures to a rubbery substance used in various applications as adhesive and/or sealer). The bus bars 410 are pre-positioned to avoid confusion that could cause assembly mistakes.

Figure 9:
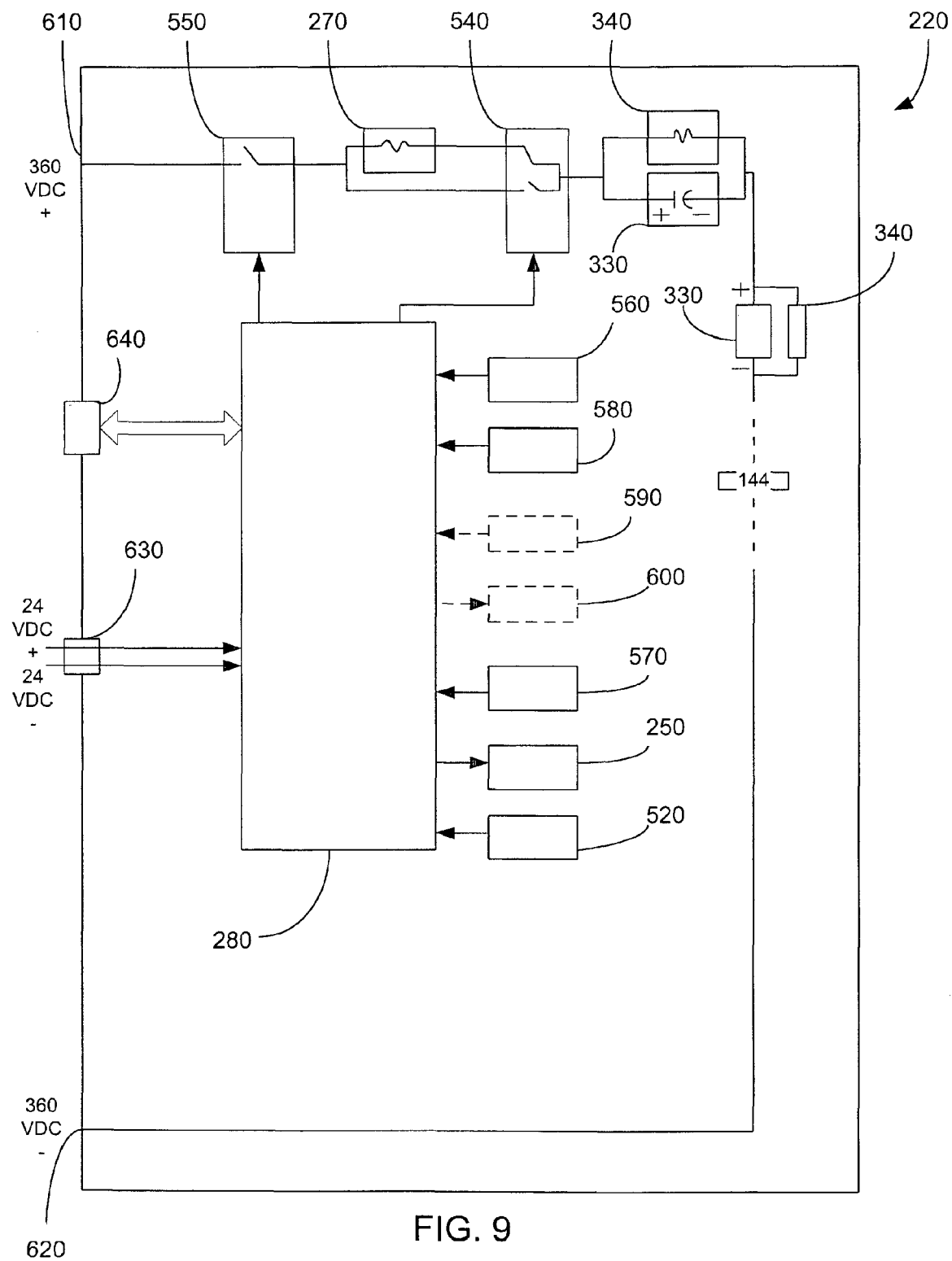
FIG. 9 is a block diagram of the ultracapacitor energy storage cell pack illustrated in FIG. 4.

FIG. 9 is a general block diagram of the ultracapacitor pack 200. As indicated above, each ultracapacitor 330 is connected in parallel with the drain resistor 340. One-hundred and forty-four (144) of these parallel connections are connected in series to provide a nominal 360 volts DC, 325 watt-hours energy storage. The value of each ultracapacitor 330 is 2600 Farads and the value and power of the drain resistor 340 is selected to completely discharge the ultracapacitor 330 over a number of hours during an inactive period of the ultracapacitor pack 200. The energy drain action is slow enough so as not to interfere with the normal operation of the ultracapacitor pack 200. The discharge is also slow enough so as not to cause any significant temperature increase from the drain resistors 340 within the ultracapacitor pack 200. The chemical composition of the ultracapacitor 330 allows charge to build up across the ultracapacitor 330 over a period of time after the ultracapacitor 330 is shorted and left open. The drain resistors 340 allow a safe discharge of the high voltage of the ultracapacitor pack 200 to eliminate any shock danger from the ultracapacitor "memory" to personnel servicing the ultracapacitor pack 200.

Because the ultracapacitors 330 can accept hundreds of amperes of electrical current during charging, a connection to an energy source would appear as a short circuit to the energy source. To accommodate this problem, a high-power precharge resistor 270 with its own heat sink is mounted inside the box enclosure 220 and used to limit the initial charging current. Based on input to a pack voltage sensor 520, the PLC 280 controls a pre-charge contactor relay 540 to engage the pre-charge resistor 270 until the ultracapacitors 330 reach a minimum safe voltage level.

The PLC 280 is the control center for additional features. Through a Control Area Network (CAN) bus interface (e.g., SAE standard J1939), the PLC 280 offers remote ON/OFF control and status reporting of: the control relay positions for on/off relay 550 and precharge relay 540, pack voltage sensor 520, ground fault interrupt (GFI) sensor 560, cooling fans 250, box temperature sensor 570, over temperature sensor 580, optional fire sensor 590, and optional fire suppression system 600. The PLC 280 also uses input from the box temperature sensor 570 to turn on and off the cooling fans 250. During normal operation of the ultracapacitor pack, the on/off relay 550 is activated. The on/off relay 550 is deactivated by the PLC 280 when the GFI sensor 560 detects a ground fault interrupt condition, when the over temperature sensor 580 detects an over-temperature condition, or the pack voltage sensor 520 detects an over-voltage condition. The fire suppression system 600 is activated by the PLC 280 in the event a fire condition is detected by the fire sensor 590 to extinguish any fire in the ultracapacitor pack 200. A 360 VDC+ stud feed thru 610 is an external power cable attachment for the positive side of the ultracapacitor pack 200. A 360 VDC− stud feed thru 620 is an external power cable attachment for the negative side of the ultracapacitor pack 200. A 24 VDC+, 24 VDC− power connector 630 provides the positive and negative dc power connections for the PLC 280. A digital data interface connector 640 includes the wires that connect to the CAN buss network and is also the port by which the PLC 280 is programmed.

The ultracapacitor pack 200 includes structural support, environmental protection, automatic cooling, electrical interconnection of the ultracapacitors, remote ON/OFF switching, a safety pre-charge circuit, a safety and automatic equalizing discharge circuit, a programmable logic controller, a digital interface to a control area data network for control and status reporting, and an optional fire sensing and suppression system. The pack is ideal for high-voltage, high-power applications of electric and hybrid-electric vehicle propulsion systems, fixed site high-power load averaging, and high-power impulse requirements.

While embodiments and applications of this invention have been shown and described, it would be apparent to those in the field that many more modifications are possible without departing from the inventive concepts herein. The invention, therefore, is not to be restricted except in the spirit of the appended claims.

What is claimed is:

1. An ultracapacitor energy storage cell pack, comprising:
   an ultracapacitor assembly including a plurality of parallel ultracapacitors and balancing resistors in series, each balancing resistor in parallel with each ultracapacitor to automatically discharge each ultracapacitor over time, thereby balancing the ultracapacitors of the ultracapacitor assembly;
   an enclosure to enclose and protect the ultracapacitor assembly;
   one or more temperature sensors to monitor temperature of the ultracapacitor assembly;
   a pack voltage sensor to monitor voltage of the ultracapacitor assembly;
   a ground fault sensor to monitor for a ground fault condition of the ultracapacitor assembly;
   a cooling system to cool the ultracapacitor assembly;
   an on/off relay coupled to the ultracapacitor assembly and a control input, the on/off relay activated during normal operation of the ultracapacitor assembly and deactivated by the control input to terminate normal operation; and
   a pre-charge resistor and a pre-charge relay coupled to the ultracapacitor assembly and the control input, the pre-charge relay activated by the control input to cause the pre-charge resistor to limit pack incoming current until the ultracapacitor assembly reaches a minimum voltage.

2. The ultracapacitor energy storage cell pack of claim 1, wherein the pack includes a controller.

3. The ultracapacitor energy storage cell pack of claim 2, wherein the controller is coupled to one or more of a pack temperature sensor or sensors, a pack voltage sensor, a ground fault sensor, a fire sensor, a fire suppression subsystem, a cooling system control input, an on/off relay control input, and a precharge resistor control relay input.

4. The ultracapacitor energy storage cell pack of claim 3, wherein the controller controls one or more of the cooling system, precharge resistor control relay input, and on/off relay from one or more of the pack temperature sensor or sensors input, the voltage sensor input, the ground fault input, the fire sensor input, and the fire suppression input.

5. The ultracapacitor energy storage cell pack of claim 3, wherein the controller has a digital data interface to a control network.

6. The ultracapacitor energy storage cell pack of claim 3, wherein the controller monitors and reports the sensor inputs to the control network interface, and controls the cooling system and on/off relay in response to commands from the network interface.

7. The ultracapacitor energy storage cell pack of claim 5, wherein the controller is a programmable logic controller with a digital data interface to an SAE standard J1939 Control Area Network (CAN).

8. The ultracapacitor energy storage cell pack of claim 1, wherein the cooling system is one or more cooling fans carried by the enclosure.

9. The ultracapacitor energy storage cell pack of claim 8, wherein an air filter is carried by the enclosure.

10. The ultracapacitor energy storage cell pack of claim 1, wherein the ultracapacitor energy storage cell pack stores up to a nominal 325 watt-hours of electrical energy at up to a nominal 360 volts DC.

11. The ultracapacitor energy storage cell pack of claim 1, wherein the enclosure includes an inside surface with an anti-corrosion and electrical insulation coating thereon.

12. The ultracapacitor energy storage cell pack of claim 1, wherein the ultracapacitor assembly includes two polycarbonate middle plate supports with cutouts that receive the ultracapacitors and balancing resistors.

13. The ultracapacitor energy storage cell pack of claim 1, wherein the ultracapacitor assembly includes an end support plate made of a glass fabric laminate with an epoxy resin, and has a pattern of holes for mounting the ultracapacitors.

14. The ultracapacitor energy storage cell pack of claim 1, wherein the ultracapacitors are mechanically and electrically interconnected with aluminum connections.

15. The ultracapacitor energy storage cell pack of claim 1, further including a fire sensor and a fire suppression subsystem activated upon a fire indication input from the fire sensor.

* * * * *